(12) United States Patent
Holland et al.

(10) Patent No.: US 8,601,158 B2
(45) Date of Patent: Dec. 3, 2013

(54) VIRTUAL GATEWAY ROUTER

(71) Applicant: Skytap, Seattle, WA (US)

(72) Inventors: Peter Holland, Seattle, WA (US); Bradley M. Schick, Seattle, WA (US)

(73) Assignee: Skytap, Seattle, WA (US)

(*) Notice: Subject to any disclaimer, the term of this patent is extended or adjusted under 35 U.S.C. 154(b) by 0 days.

(21) Appl. No.: 13/920,977

(22) Filed: Jun. 18, 2013

(65) Prior Publication Data

US 2013/0283270 A1    Oct. 24, 2013

Related U.S. Application Data

(63) Continuation of application No. 13/761,084, filed on Feb. 6, 2013, now Pat. No. 8,478,902.

(60) Provisional application No. 61/595,573, filed on Feb. 6, 2012.

(51) Int. Cl.
*G06F 15/16* (2006.01)
*G06F 12/00* (2006.01)

(52) U.S. Cl.
USPC .......................................... 709/238; 709/250

(58) Field of Classification Search
USPC .......... 709/203, 204, 223–229, 238–242, 250
See application file for complete search history.

(56) References Cited

U.S. PATENT DOCUMENTS

| | | | |
|---|---|---|---|
| 7,908,395 B1 | 3/2011 | Salkewicz | |
| 8,130,764 B1* | 3/2012 | Salkewicz | 370/398 |
| 8,478,902 B1 | 7/2013 | Holland et al. | |
| 2011/0141881 A1 | 6/2011 | Joshi et al. | |
| 2011/0292942 A1* | 12/2011 | Imai | 370/392 |
| 2012/0084389 A1* | 4/2012 | Imai | 709/217 |
| 2012/0182992 A1 | 7/2012 | Cowart et al. | |

OTHER PUBLICATIONS

U.S. Appl. No. 13/921,024, filed Jun. 18, 2013, Holland et al.

* cited by examiner

*Primary Examiner* — Zarni Maung
(74) *Attorney, Agent, or Firm* — Perkins Coie LLP

(57) ABSTRACT

A facility for configuring a virtual data center is described. A user such as an administrator uses a management interface to input information specifying a configuration for a virtual data center including virtual network nodes and virtual routers. In response, the facility instantiates each virtual network router needed for the configuration, such as by, for each, instantiating on commodity hardware a virtual machine running a general-purpose operating system used to provide routing services to the virtual network nodes.

20 Claims, 7 Drawing Sheets

VIRTUAL GATEWAY ROUTER

CROSS-REFERENCE TO RELATED APPLICATION(S)

This application is a continuation of U.S. patent application Ser. No. 13/761,084, filed Feb. 6, 2013, which claims the benefit of U.S. Provisional Patent Application No. 61/595,573, filed on Feb. 6, 2012, each of which is incorporated by reference in entirety.

Each of the following applications is also hereby incorporated by reference in its entirety: U.S. Provisional Patent Application No. 61/050,163, filed on May 2, 2008; U.S. Provisional Patent Application No. 61/101,665, filed on Sep. 30, 2008; U.S. patent application Ser. No. 12/434,619, filed May 2, 2009; U.S. patent application Ser. No. 12/434,620, filed on May 2, 2009; U.S. patent application Ser. No. 12/434,621, filed on May 2, 2009; and U.S. patent application Ser. No. 13/276,153, filed on Oct. 18, 2011.

TECHNICAL FIELD

The described technology is directed to the fields of virtual computing and data networks.

BACKGROUND

A virtual machine is a software construct designed to run computer programs like a real physical machine. As an example, a virtual machine may comprise various software components for running executable code written for a particular computing platform. Such executable code may include, among other things, operating system code, application programs, software drivers, and so on.

A virtual machine does not necessarily have a direct correspondence to a real physical machine; however, virtual machines are often designed to imitate the behavior of specific hardware architectures. As an example, a virtual machine may be designed to imitate the behavior of an x86 processor.

DETAILED DESCRIPTION

Figure 1:
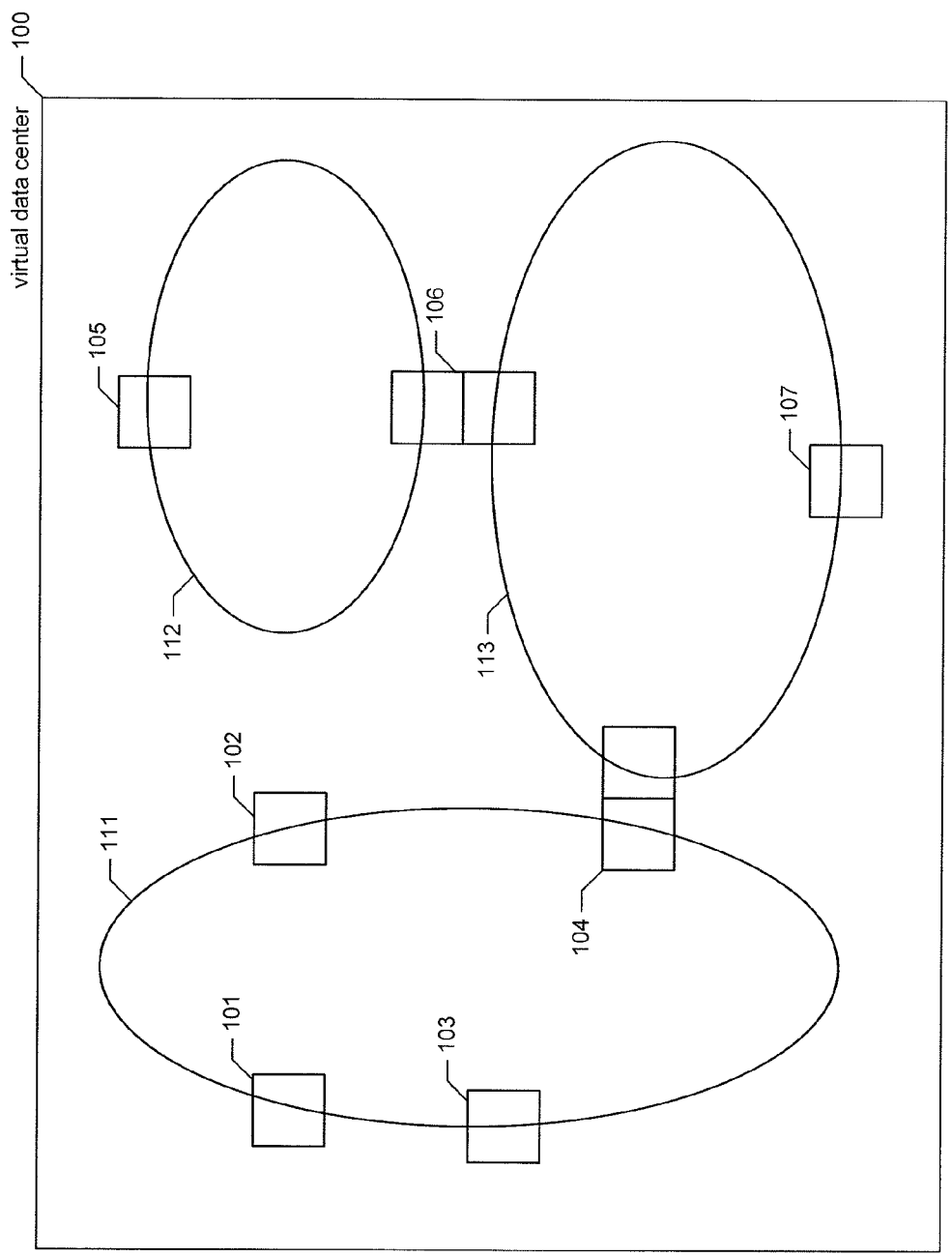
FIG. 1 is a diagram showing a sample virtual data center established and operated by the facility.

The inventors have noted the desirability of connecting virtual machines together in one or more virtual computer networks, sometimes called "subnets," so that they can exchange data in a manner very similar to physical machines exchanging data via a physical data network. The inventors have also noted the desirability of being able to connect different subgroups of virtual machines to different virtual networks as a "virtual data center." The inventors have also recognized the desirability of being able to connect virtual machines in one or more of these virtual networks to machines or networks that are external to the virtual data center, either external physical machines or networks, external virtual machines or networks, or a combination of both.

Accordingly, a software facility ("the facility") is described that establishes and operates a virtual data center having one or more virtual gateway routers. A user creates a virtual data center by specifying its characteristics to a management interface provided by the facility. For example, for each of one or more networks to be established in the virtual data center, the user can specify a number of virtual machines to establish as nodes on the network and a set of network services to provide on the network. In response, the facility instantiates a virtual gateway router for the virtual data center by creating a new virtual machine on a commodity physical machine running a general purpose operating system, such as an open source general purpose operating system, loading onto the created virtual machine a virtual gateway router software image including a general-purpose operating system such as Linux, and configuring the networking components of the operating system in accordance with the characteristics specified by the user. The facility additionally creates the virtual data center nodes specified by the user and the virtual gateway router serves as a router to route traffic between the virtual data center nodes. In various embodiments, the virtual gateway router performs a variety of network gateway services on behalf of the virtual data center nodes, including but not limited to the following: DHCP services; DNS services; network-attached storage services, such as SMB/CIFS services, NFS services, and FTP services; firewall services; network address translation and port forwarding services; load balancing services; and network traffic shaping services. In some embodiments, when the user instructs the management interface that virtual data center is no longer needed, the facility deallocates the virtual machine containing the virtual gateway router, as well as the virtual machines containing the virtual data center nodes.

While operating in some or all of the ways described above, the facility provides a number of benefits, including the ability to host a large number of virtual routers in a physical machine, such as 80 virtual routers in a single server blade; low cost, based upon the use of commodity hardware, which becomes less expensive over time, and a general purpose operating system, such as an open source general purpose operating system; the ability to provide effective data and fault isolation to different virtual networks not explicitly connected and different virtual data centers from one another by servicing them with different virtual routers not specified to be connected; and flexibility to implement a new needed network service, such as a firewall, for the virtual router on the same commodity hardware and general purpose operating system.

FIG. 1 is a diagram showing a sample virtual data center established and operated by the facility. The virtual data center 100 includes a number of virtual machines 101-107. Different combinations of these virtual machines are connected by three different virtual networks 111-113. For example, virtual network 113 connects the following three virtual machines, or "nodes": 104, 106, and 107. Node 104 is connected to both virtual network 111 and 113, and can use virtual network 111 to exchange data with nodes 101, 102, and 103, while at the same time using virtual network 113 to exchange data with nodes 106 and 107.

Figure 2:
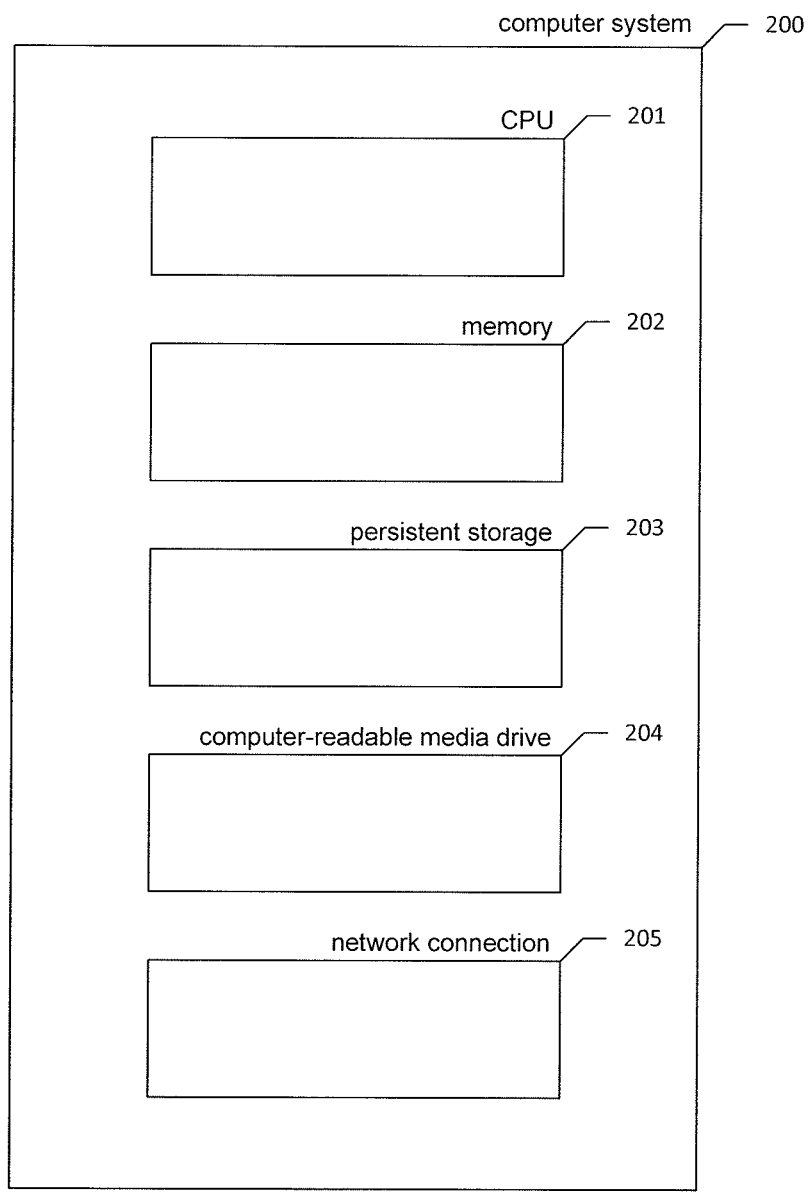
FIG. 2 is a block diagram showing some of the components typically incorporated in at least some of the computer systems and other devices on which the facility executes.

FIG. 2 is a block diagram showing some of the components typically incorporated in at least some of the computer systems and other devices on which the facility executes. In some embodiments, these computer systems and other devices 200 are commodity blade servers installed in a compatible server chassis. In various other embodiments, these computer systems and other devices 200 can include other commodity computer hardware, server computer systems, desktop computer systems, laptop computer systems, netbooks, etc. In various embodiments, these computer systems and devices 200 may include one or more central processing units ("CPUs") 201 for executing computer programs; a computer memory 202 for storing programs and data while they are being used, including the facility and associated data; a persistent storage device 203, such as a hard drive, for persistently storing programs and data; a computer-readable media drive 204, such as a floppy, CD-ROM, or DVD drive, for reading programs and data stored on a computer-readable medium; and a network connection 205 for connecting the computer system to other computer systems, such as via the Internet or another data transmission network and its networking hardware, such as switches, routers, repeaters, electrical cables and optical fibers, light emitters and receivers, radio transmitters and receivers, and the like, so that data signals such as data signals conveying data structures, programs, and unstructured data may be sent between such computer systems. While computer systems configured as described above are typically used to support the operation of the facility, those skilled in the art will appreciate that the facility may be implemented using devices of various types and configurations, and having various components.

Figure 3:
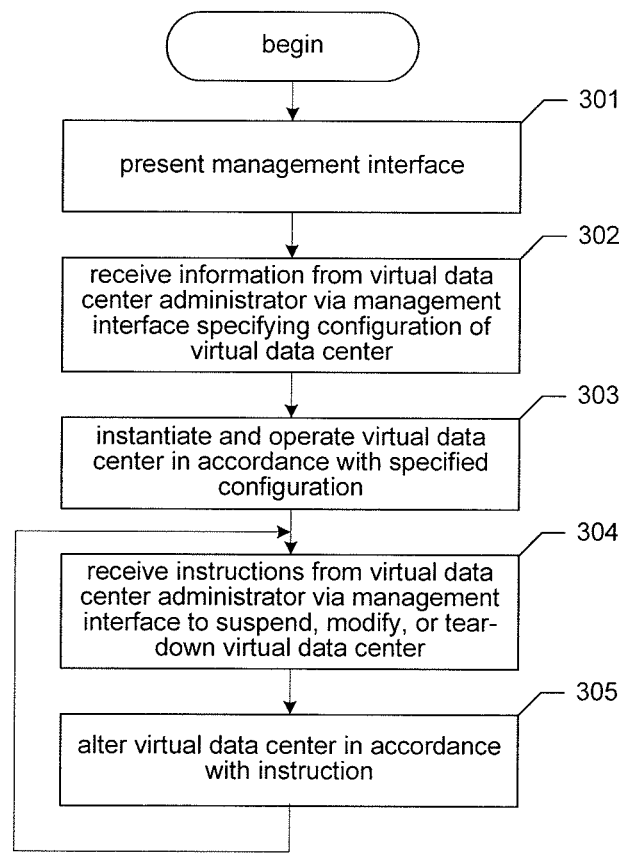
FIG. 3 is a flow diagram showing steps typically performed by the facility in order to configure a new virtual data center.

FIG. 3 is a flow diagram showing steps typically performed by the facility in order to configure a new virtual data center. Those skilled in the art will appreciate that the steps shown in FIG. 3 and in each of the flow diagrams discussed below may be altered in a variety of ways. For example, the order of the steps may be rearranged; some steps may be performed in parallel; shown steps may be omitted, or other steps may be included; a shown step may be divided into substeps, or multiple shown steps may be combined into a single step, etc.

In steps 301-302, the facility presents a management interface to a user such as a virtual data center administrator, and receives information from that user via the management interface that specifies configuration information for a new virtual data center.

Figure 4:
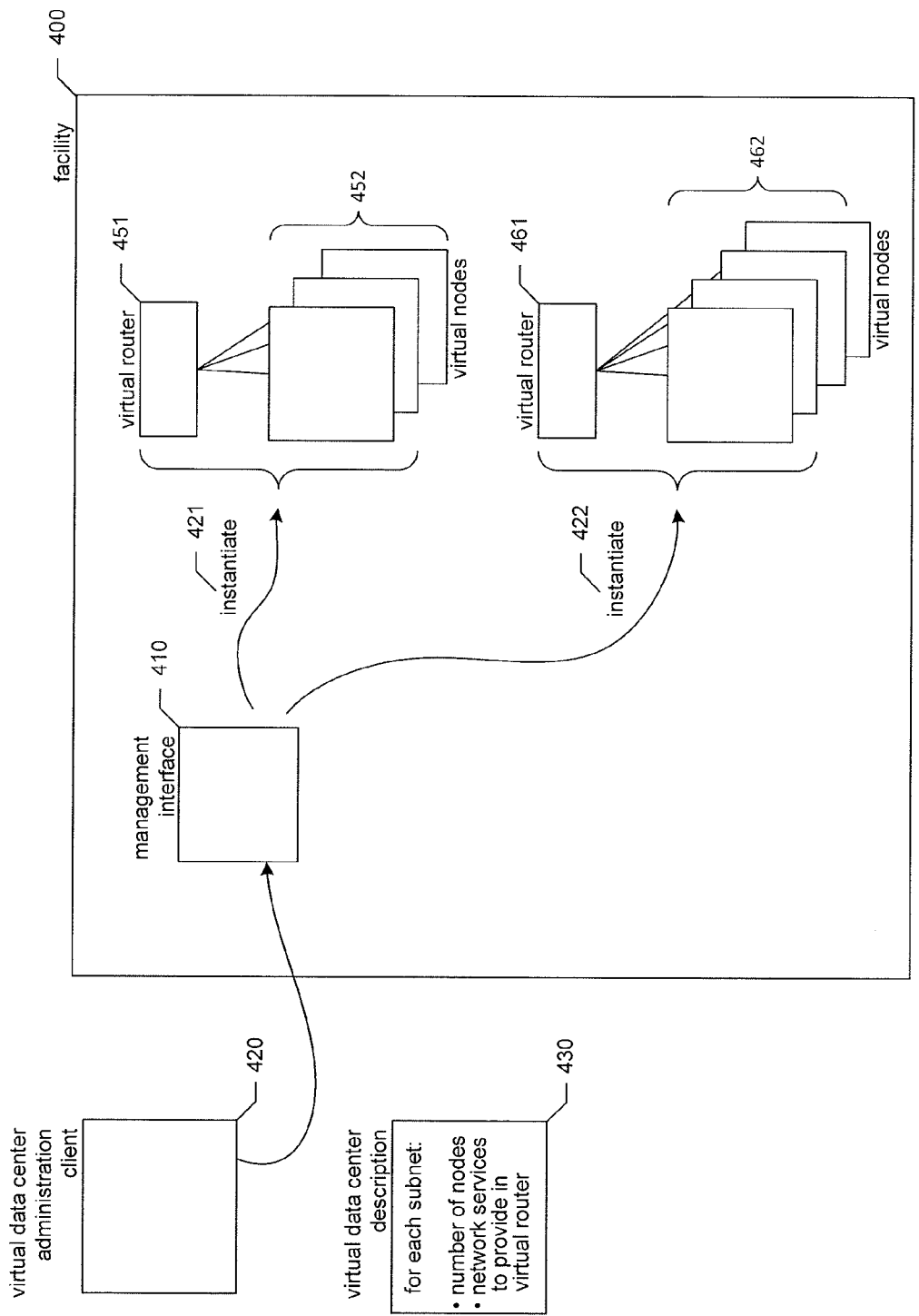
FIG. 4 is a data flow diagram depicting the configuration of a new virtual data center.

FIG. 4 is a data flow diagram depicting the configuration of a new virtual data center. Steps 301-302 are represented in FIG. 4 by data flow 430, a virtual data center description, passing from virtual data center administrator client computer 420 to the management interface 410 of the facility. It can be seen that the virtual data center description includes information about each of one or more subnets to be included in the virtual data center, including the number of nodes to be connected by the subnet and the network services to be provided for the subnet in the subnet's virtual router.

Figure 5:
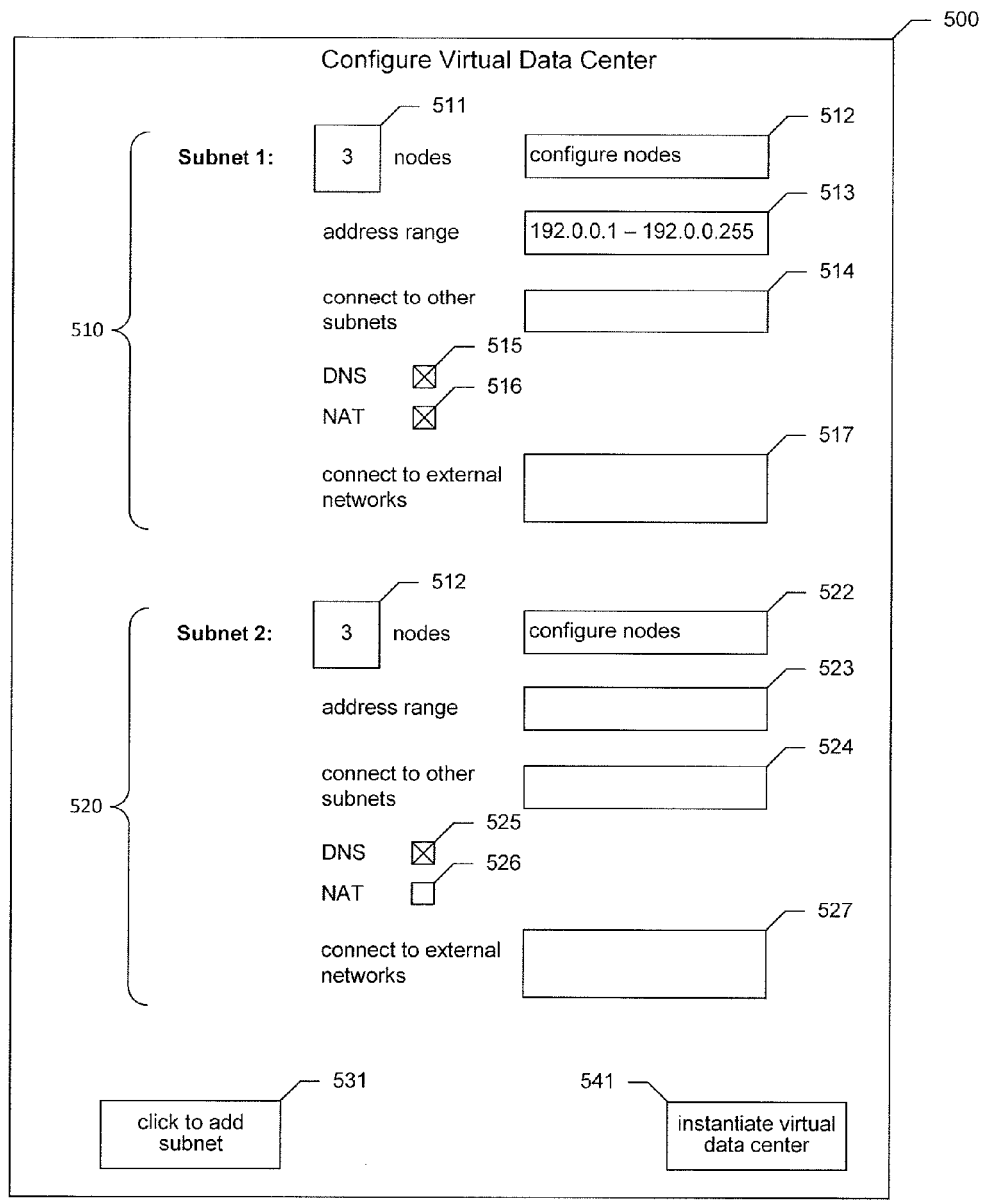
FIG. 5 is a user interface diagram showing a sample management interface display that the facility causes to be presented to a user such as a virtual data center administrator in some embodiments.

FIG. 5 is a user interface diagram showing a sample management interface display that the facility causes to be presented to a user such as a virtual data center administrator in some embodiments. In some embodiments, this display takes the form of a web page served to a web client used by the virtual data center administrator by a web server operated in connection with the facility. The display 500 includes sections 510 and 520 each about a different subnet to be included in the new virtual data center. In order to configure the first subnet, the user inputs a number of nodes 511 to be connected in the subnet. The user may go on to operate control 512 in order to configure these nodes, such as specifying their computing or memory capacity, operating systems and other programs to be installed on them, configuration parameters, etc. The user further specifies an address range 513 for the nodes of the subnet; information 514 about connecting to other subnets of the virtual data center; indications 515 and 516 of whether Domain Name Services and Network Address Translation services, respectively, should be enabled for the subnet; and information 517 about external networks to which the subnet should be connected, such as via an IPSec-secured tunnel or a virtual edge router. In some embodiments, default values are initially provided for some or all of these kinds of information, which may be overridden by the user. In various embodiments, the management interface provides opportunities to specify various other parameters used in configuring each subnet. The user may operate control 531 in order to add another subnet to the existing list of subnets. The user may operate control 541 in order to instruct the facility to instantiate a virtual data center in accordance with the information presently specified in the display.

Returning to FIG. 3, in step 303, after the virtual data center description is submitted to the management interface, the facility instantiates and operates the virtual data center in accordance with the virtual data center configurations specified using the management interface.

Returning to FIG. 4, information flows 421 and 422 show the instantiation of the virtual machines needed to constitute each of the subnets specified in the virtual data center description. As will be discussed in greater detail below, this involves instantiating for each subnet a virtual machine to serve as a subnet's virtual router 451 and 461, as well as virtual machines to serve as each of the subnet's virtual nodes 452 and 462. In some embodiments, a single virtual machine simultaneously serves as the virtual router for multiple subnets. In some embodiments, the facility performs the instantiation of the virtual machines for a virtual data center's virtual routers—or even a larger number of virtual machines for virtual routers—in parallel. This also involves configuring the networking components of the operating system of the virtual routers after their virtual machines are instantiated.

In various embodiments, the configuration of the networking components involves one or more of the following: populating IP tables such as a filter table specifying firewall, NAT, and/or packet mangling rules; routing tables; traffic control information; connection and flow tracking information for protocols such as TCP, UDP, and ICMP; generic route encapsulation tunnel configuration information; IPSec endpoint configuration; name for service configuration; DHCP service configuration; fileshare service SMB/CIFS information, etc.

Returning to FIG. 3, the facility proceeds to operate the virtual data center as configured. This involves operating the virtual routers, IPSec endpoints, and/or inbound routers to route network traffic to and/or from the virtual data center's nodes. In step 304, the facility may at a later time receive instructions from the virtual data center administrator to suspend, modify, or tear down the virtual data center instantiated in step 303. In response, in step 305, the facility alters the virtual data center in the manner specified by the virtual data center administrator in step 304. After step 305, the facility continues in step 304.

Figure 6:
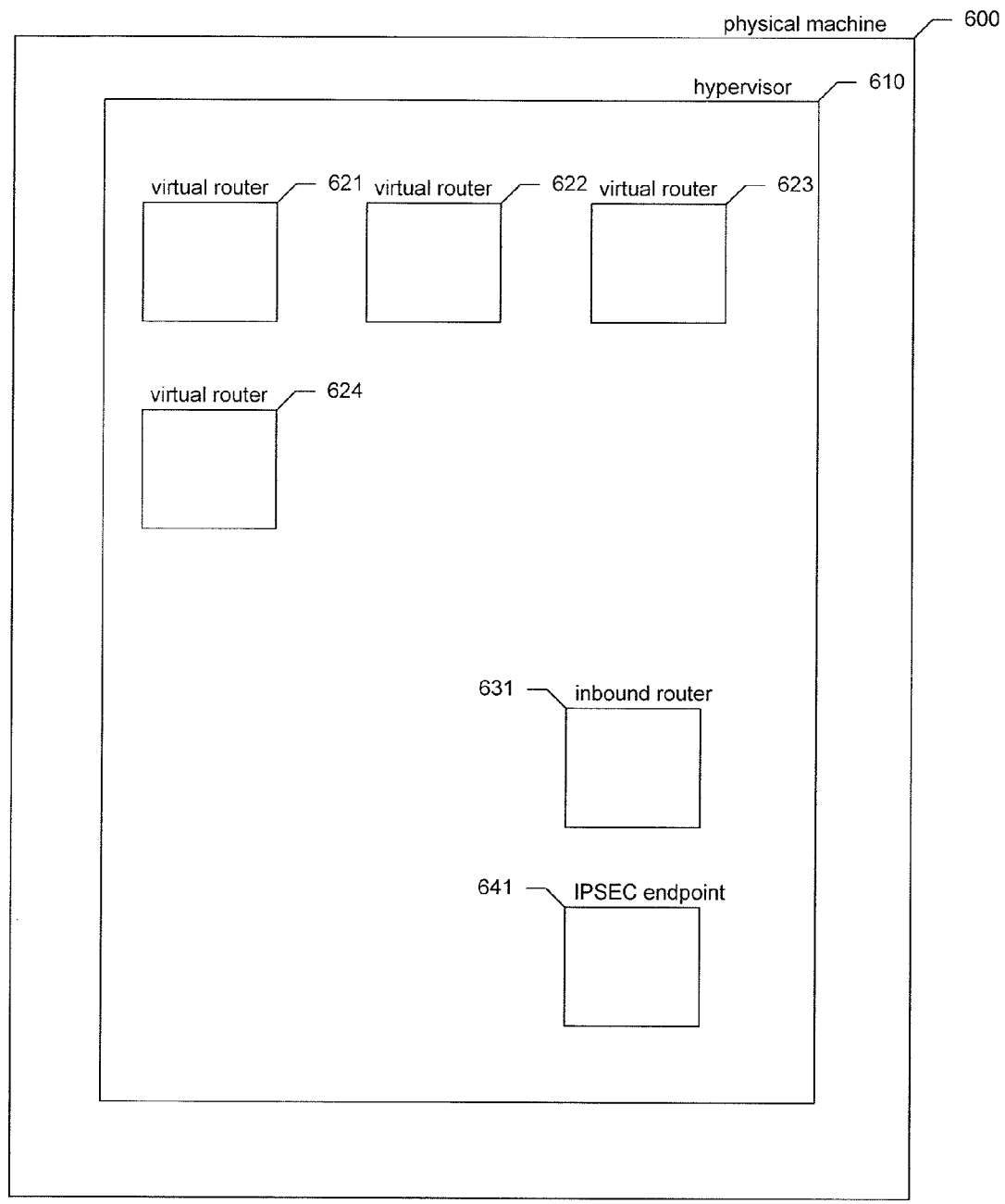
FIG. 6 is a block diagram showing contents of a physical computer system used to host at least portions of virtual networks for a virtual data center.

FIG. 6 is a block diagram showing contents of a physical computer system used to host at least portions of virtual networks for a virtual data center. In some embodiments, the physical machine 600 is commodity hardware, such as a conventional blade server, that executes a general-purpose operating system. The physical machine 600 executes a hypervisor 610. Instantiated within the hypervisor are a number of virtual machines. Each of virtual machine 621 and 624 are virtual machines instantiated as virtual routers for a different subnetwork. The contents of these virtual machines are discussed in greater detail below in connection with FIG. 7. As noted above, in some embodiments, the facility manages multiple subnets using a single virtual router running on a single virtual machine. In some embodiments, the hypervisor also contains virtual machines instantiated as the virtual network nodes included in the subnets to which the virtual routers correspond. In some embodiments, these virtual network node virtual machines are instantiated and operated on a different physical machine.

The virtual routers are generally isolated from one another, so that traffic cannot flow between any pair of them. In some embodiments, the facility can connect particular pairs of virtual routers in response to configuration instructions from the virtual data center administrator in order to enable the flow of traffic between the nodes of the two subnets associated with the virtual routers. The hypervisor can also contain one or more inbound routers 631 to which the facility can connect a virtual router in response to configuration instructions from the virtual data center administrator in order to route traffic to nodes connected to the subnet associated with the virtual router. The hypervisor can also contain one or more virtual machines instantiated as IPSec endpoints to which the facility can connect a virtual router in response to configuration instructions from the virtual data center administrator in order to route traffic between subnet associated with the virtual router and external nodes via secure tunnels.

Figure 7:
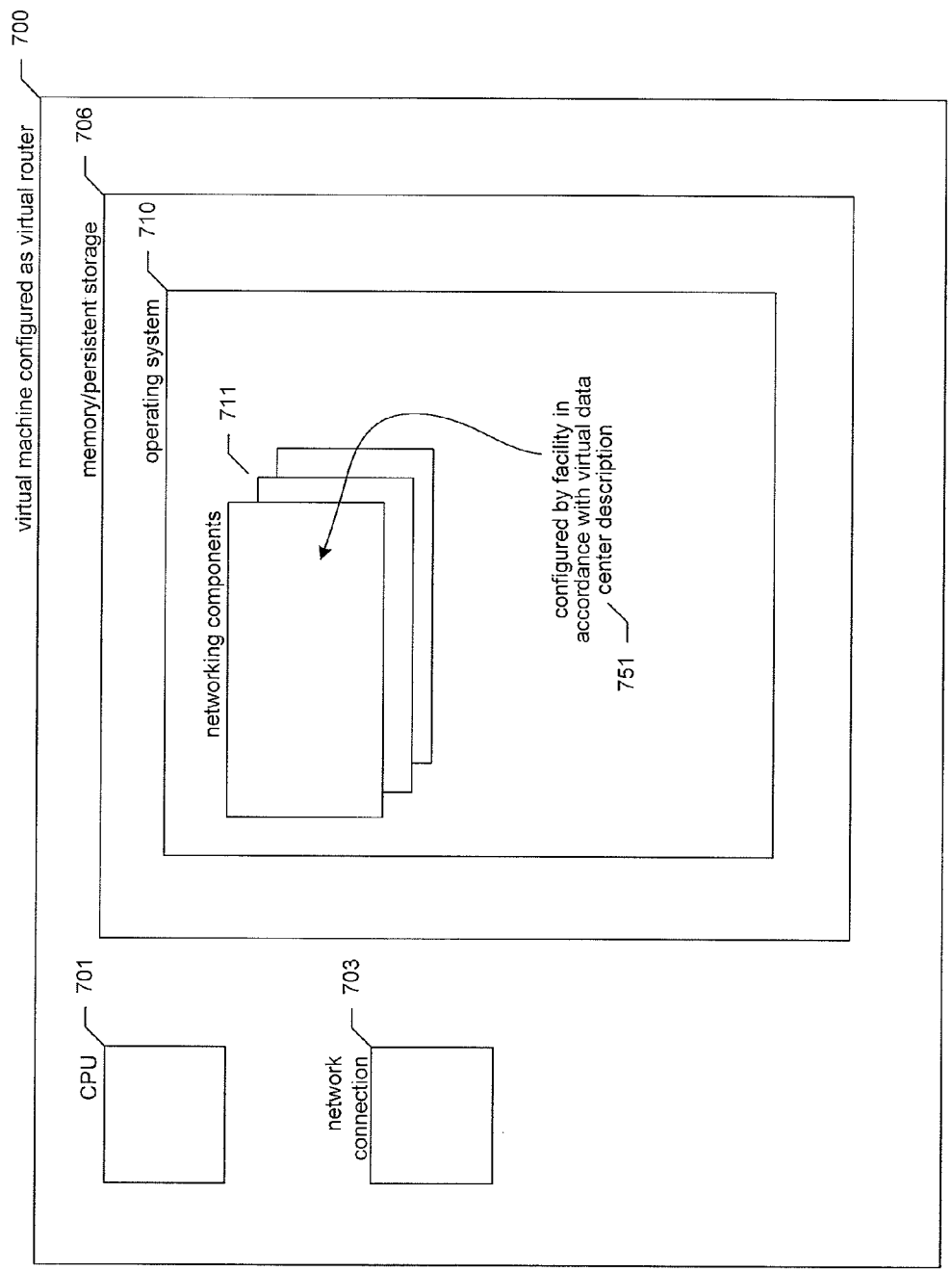
FIG. 7 is a block diagram showing details of a virtual machine configured by the facility as a virtual router.

FIG. 7 is a block diagram showing details of a virtual machine configured by the facility as a virtual router. The virtual machine 700 includes one or more virtual CPUs 701; one or more network connections, also called "network interface cards" 703; and virtual memory and/or persistent storage 706 for storing data. These resources are provided to the virtual machine by the hypervisor. Loaded into memory 706 is a general-purpose operating system. In some embodiments, the operating system is an open-source operating system. In some embodiments, the operating system is a flavor of Linux, such as OpenWrt Linux, available from openwrt.org. The operating system 710 includes networking component 711. As part of the process of instantiating the virtual data center, the facility acts in accordance with data flow 751 to configure the networking components of the operating system in accordance with the virtual data center description received by the management interface from the virtual data center administrator, setting parameters, enabling or disabling services, etc.

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

We claim:

1. A computer-readable storage device having contents adapted to cause a computing system to perform operations for provisioning virtual data centers, the operations comprising:
   receiving a request to instantiate a virtual network router for routing traffic among a plurality of virtual network nodes;
   selecting one of a plurality of physical machines each executing at least one virtual machine instantiated as a virtual network router; and
   in response to the received request, instantiating a new virtual machine on the selected physical machine as a virtual network router.

2. The computer-readable storage device of claim 1 wherein the request is received via a visual user interface.

3. The computer-readable storage device of claim 1, the operations further comprising causing the virtual machine instantiated as a virtual network router to route traffic among a plurality of virtual network nodes comprising a single subnet.

4. The computer-readable storage device of claim 1, the operations further comprising causing the virtual machine instantiated as a virtual network router to route traffic among pluralities of virtual network nodes each comprising a subnet, in such a manner that the virtual network nodes of each subnet are isolated.

5. The computer-readable storage device of claim 1, the operations further comprising causing the virtual machine instantiated as a virtual network router to provide network gateway services to the plurality of virtual network nodes.

6. The computer-readable storage device of claim 1, the operations further comprising causing the virtual machine instantiated as a virtual network router to provide DHCP services to the plurality of virtual network nodes.

7. The computer-readable storage device of claim 1, the operations further comprising causing the virtual machine instantiated as a virtual network router to provide DNS services to the plurality of virtual network nodes.

8. The computer-readable storage device of claim 1, the operations further comprising causing the virtual machine instantiated as a virtual network router to provide network-attached storage services to the plurality of virtual network nodes.

9. The computer-readable storage device of claim 1, the operations further comprising causing the virtual machine instantiated as a virtual network router to provide firewall services to the plurality of virtual network nodes.

10. The computer-readable storage device of claim 1, the operations further comprising causing the virtual machine instantiated as a virtual network router to provide network address translation and port forwarding services to the plurality of virtual network nodes.

11. The computer-readable storage device of claim 1, the operations further comprising causing the virtual machine instantiated as a virtual network router to provide load balancing services to the plurality of virtual network nodes.

12. The computer-readable storage device of claim 1, the operations further comprising causing the virtual machine instantiated as a virtual network router to provide network traffic shaping services to the plurality of virtual network nodes.

13. An apparatus for providing network routing among the plurality of virtual machines instantiated as network nodes, comprising:
   one or more physical processors each comprising one or more processor cores; and
   one or more physical computer memories collectively containing a plurality of virtual machine instances each instantiated as a virtual network router configured to route network traffic between a proper subset of the plurality of virtual machines instantiated as network nodes.

14. The apparatus of claim 13 wherein a general-purpose operating system is installed on each of the plurality of virtual machine instances instantiated as virtual network routers in order to perform the routing.

15. The apparatus of claim 13 wherein the physical processors and physical computer memories comprise a general-purpose computer.

16. One or more computer-readable storage devices collectively storing a data structure relating to the operation of a virtual data center configuration, the data structure comprising:

for each of a plurality of virtual machines instantiated as virtual network routers and executing in order to route traffic among a plurality of virtual networks each comprising a plurality of virtual network nodes, information identifying the virtual machine instantiated as a virtual network router, such that the information contained by the data structure for a particular virtual machine instantiated as a virtual network router can be used to access the particular virtual machine.

17. The computer-readable storage devices of claim 16, the data structure further comprising:

for each of the plurality of virtual machines instantiated as virtual network routers and executing in order to route traffic among the plurality of virtual network nodes comprising each of the plurality of virtual machines, information identifying a plurality of virtual network nodes connected by the virtual machine instantiated as a virtual network router.

18. The computer-readable storage devices of claim 16, the data structure further comprising:

for each of at least one of the plurality of virtual machines instantiated as virtual network routers and executing in order to route traffic among the plurality of virtual network nodes comprising each of the plurality of virtual machines, information identifying another virtual machine instantiated as a virtual network router that is connected to the virtual machine instantiated as a virtual network router.

19. The computer-readable storage devices of claim 16, the data structure further comprising:

for each of at least one of the plurality of virtual machines instantiated as virtual network routers and executing in order to route traffic among the plurality of virtual network nodes comprising each of the plurality of virtual machines, information identifying an IPSec endpoint for creating a secure tunnel to a network outside the virtual data center that is connected to the virtual machine instantiated as a virtual network router.

20. The computer-readable storage devices of claim 16, the data structure further comprising:

for each of at least one of the plurality of virtual machines instantiated as virtual network routers and executing in order to route traffic among the plurality of virtual network nodes comprising each of the plurality of virtual machines, information identifying a virtual edge router for connecting to an external network outside the virtual data center that is connected to the virtual machine instantiated as a virtual network router.

* * * * *

UNITED STATES PATENT AND TRADEMARK OFFICE
CERTIFICATE OF CORRECTION

| | | |
|---|---|---|
| PATENT NO. | : 8,601,158 B2 | Page 1 of 1 |
| APPLICATION NO. | : 13/920977 | |
| DATED | : December 3, 2013 | |
| INVENTOR(S) | : Peter Holland et al. | |

It is certified that error appears in the above-identified patent and that said Letters Patent is hereby corrected as shown below:

In the specification

In column 1, line 9, after "is" insert -- hereby --.

In column 1, line 10, after "in" insert -- its --.

Signed and Sealed this
Twenty-fourth Day of November, 2015

Michelle K. Lee
*Director of the United States Patent and Trademark Office*